(12) United States Patent
Lee et al.

(10) Patent No.: US 7,953,391 B2
(45) Date of Patent: May 31, 2011

(54) METHOD FOR INCLUSIVE AUTHENTICATION AND MANAGEMENT OF SERVICE PROVIDER, TERMINAL AND USER IDENTITY MODULE, AND SYSTEM AND TERMINAL DEVICE USING THE METHOD

(75) Inventors: Byung-Rae Lee, Seoul (KR); Sung-Oh Hwang, Yongin-si (KR); Wuk Kim, Gwacheon-si (KR)

(73) Assignee: Samsung Electronics Co., Ltd (KR)

( * ) Notice: Subject to any disclaimer, the term of this patent is extended or adjusted under 35 U.S.C. 154(b) by 1397 days.

(21) Appl. No.: 11/434,097

(22) Filed: May 15, 2006

(65) Prior Publication Data

US 2006/0281442 A1    Dec. 14, 2006

(30) Foreign Application Priority Data

Jun. 3, 2005  (KR) ................ 10-2005-0048038

(51) Int. Cl.
*H04M 1/66* (2006.01)
*H04L 9/32* (2006.01)
*H04W 12/00* (2009.01)

(52) U.S. Cl. ........ 455/411; 713/169; 713/176; 713/180; 380/247

(58) Field of Classification Search .............. 455/410, 455/411, 558; 380/247; 713/150, 168, 176, 713/180, 169
See application file for complete search history.

(56) References Cited

U.S. PATENT DOCUMENTS

| 7,054,613 | B2 * | 5/2006 | Smeets | 455/410 |
| 7,123,721 | B2 * | 10/2006 | Panjwani et al. | 380/270 |
| 7,324,645 | B1 * | 1/2008 | Juopperi et al. | 380/247 |
| 7,711,954 | B2 * | 5/2010 | Vantalon et al. | 713/168 |
| 7,734,922 | B2 * | 6/2010 | Lee et al. | 713/171 |
| 2002/0154632 | A1 * | 10/2002 | Wang et al. | 370/389 |
| 2003/0008637 | A1 * | 1/2003 | Vatanen | 455/410 |
| 2003/0172090 | A1 * | 9/2003 | Asunmaa et al. | 707/200 |
| 2004/0152446 | A1 | 8/2004 | Saunders et al. | |
| 2004/0157584 | A1 | 8/2004 | Bensimon et al. | |
| 2006/0205388 | A1 * | 9/2006 | Semple et al. | 455/411 |
| 2006/0206710 | A1 * | 9/2006 | Gehrmann | 713/168 |

FOREIGN PATENT DOCUMENTS

| JP | 2002-344623 | 11/2002 |
| JP | 2004-180310 | 6/2004 |
| JP | 2004-297138 | 10/2004 |
| WO | WO 2005/41608 | 5/2005 |

OTHER PUBLICATIONS

"Secure Bootstrapped Keys in GSM" U.S. Appl. No. 60/650,358 for support of Semple et al. (US-2006/0205388), pp. 1-2.*
"Secure Bootstraping with Cave" U.S. Appl. No. 60/654,133 for support of Semple et al. (US-2006/0205388), pp. 1-4.*

* cited by examiner

*Primary Examiner* — Matthew Sams
(74) *Attorney, Agent, or Firm* — The Farrell Law Firm, P.C.

(57) ABSTRACT

Disclosed are a method and a system for mutual inclusive authentication between a service provider, a terminal and a user identity module. The authentication system is configured in a structure that can interact with a public key infrastructure of the current network security environment and can be independently used in a specific network system. The inclusive authentication method is divided into public key authentication and symmetric key authentication. Mutual authentication can be made between a service provider, a terminal and a user identity module using any of the two authentication schemes. Then a user can access content on any terminal device using the content license based on the user's identity.

32 Claims, 7 Drawing Sheets

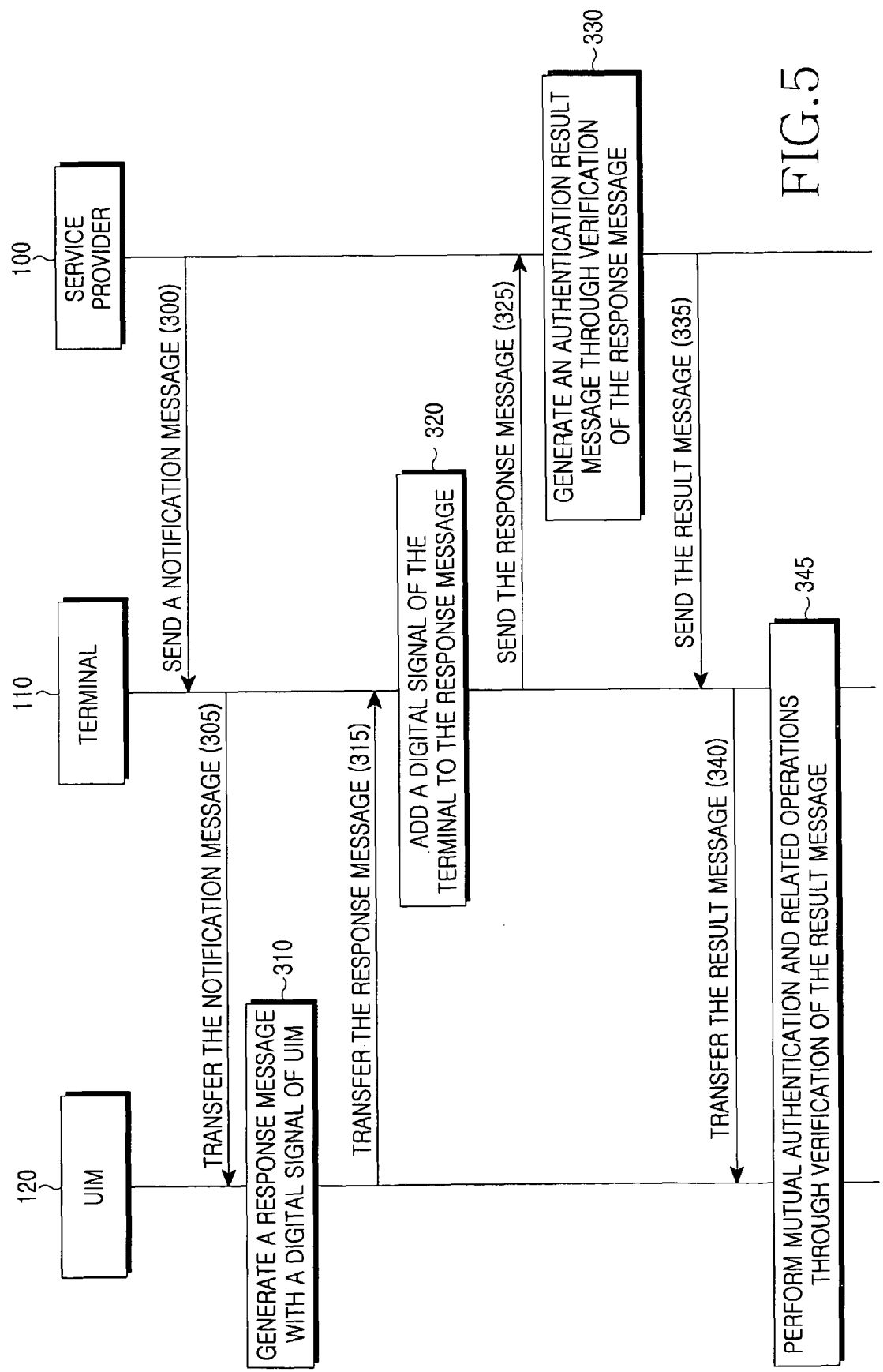

FIG.6A

| ID_SP | RND | TS1 | Sign_SP(ID_SP ‖ RND ‖ TS1) |
|---|---|---|---|
| 400 | 405 | 410 | 420 |

FIG.6B

| ID_SP | RND | TS1 | ID_U | Sign_U(ID_SP ‖ RND ‖ TS1 ‖ ID_U) |
|---|---|---|---|---|
| 400 | 405 | 410 | 440 | 445 |

FIG.6C

| ID_SP | RND | TS1 | ID_U | Sign_U(ID_SP ‖ RND ‖ TS1 ‖ ID_U) | ID_T | Sign_T(ID_SP ‖ RND ‖ TS1 ‖ ID_T) |
|---|---|---|---|---|---|---|
| 400 | 405 | 410 | 440 | 445 | 450 | 455 |

FIG.6D

| E(Pub_U,K) | Proof_U | Proof_T | TS2 | Sign_SP(E(Pub_U,K) ‖ Proof_U ‖ Proof_T ‖ TS2) |
|---|---|---|---|---|
| 460 | 465 | 470 | 475 | 480 |

610 — | ID_SP | RND | TS1 | MAC1(ID_SP ‖ RND ‖ TS1) | MAC2(ID_SP ‖ RND ‖ TS1) |
          615   620    625                                630

FIG.8D

| ID_SP | RND | TS1 | ID_U | MAC1(ID_SP ‖ RND ‖ TS1 ‖ ID_U) |
                           635    640

FIG.8E

| ID_SP | RND | TS1 | ID_U | MAC1(ID_SP ‖ RND ‖ TS1 ‖ ID_U) | ID_T | MAC2(ID_SP ‖ RND ‖ TS1 ‖ ID_T) |
                                                              650    655

FIG.8F

660 — | E(Sym1,K) | Proof_U | Proof_T | TS2 | MAC1(E(Sym1,K) ‖ Proof_T ‖ TS2) | MAC2(Proof_U ‖ TS2) |
                  665       670       675    680                                685

FIG.8G

| E(Sym1,K) | Proof_T | TS2 | MAC1(E(Sym1,K) ‖ Proof_T ‖ TS2) |

METHOD FOR INCLUSIVE AUTHENTICATION AND MANAGEMENT OF SERVICE PROVIDER, TERMINAL AND USER IDENTITY MODULE, AND SYSTEM AND TERMINAL DEVICE USING THE METHOD

PRIORITY

This application claims priority to an application entitled "Method for Inclusive Authentication and Management of Service Provider, Terminal and User Identity Module, and System and Terminal Device Using the Method" filed with the Korean Intellectual Property Office on Jun. 3, 2005 and assigned Serial No. 2005-48038, the contents of which are incorporated herein by reference.

BACKGROUND OF THE INVENTION

1. Field of the Invention

The present invention relates to a method for inclusive authentication and management of a service provider, a terminal and a user identity device, and a system and a terminal device using the method.

2. Description of the Related Art

With the rapid development of wireless Internet and communication technologies, various data or Internet services can be received through user identity modules ("UIM") and mobile terminals. However, more and more of such services are becoming pay services. Recently, copyright protection technologies, such as digital rights management ("DRM"), have been introduced to protect the copyright of the content of the pay services.

DRM is one of the most effective methods for controlling the use of content and protecting the content ownership and copyright. Basically, DRM technologies allow free distribution of encrypted content between users. In order to use the content, however, a user rights object ("RO") is required. The ease of illegal copying and distribution of content in the digital environment has brought about a massive increase of copyright infringement and losses to content providers. In response to these concerns, DRM technologies based on flexibility and convenience of each user's rights object focus on security and thus permit only authorized users to access content. Mutual authentication between devices is necessary to ensure security.

FIG. 1 is a diagram showing a process of mutual authentication between a BSF (Bootstrapping Server Function) and a UE (User Equipment) in general 3GPP (3d Generation Partnership Project) system. 3GPP GBA (Generic Bootstrapping Architecture) is a generic authentication scheme used between a universal ID card (UICC)-based UE and a BSF. This authentication scheme is implemented through the following process, as specified in the technical specifications 3GPP TS 33.220 and 33.102.

At step 30, a UE 10 may send a message requesting for user authentication to a BSF 20. The request message sent to the BSF 20 includes user identity information of the UE 10. Upon receiving the message, the BSF 20 calculates an authentication vector associated with a UICC (Universal IC Card) included in the UE 10 at step 40. More specifically, the BSF 20 calculates an authentication vector consisting of RAND, AUTN, XRES, CK and IK. RAND refers to a random number. AUTN refers to an authentication token necessary for the UE 10 to do a network authentication. XRES refers to an expected response which is compared with a response (RES) transmitted by the UICC to authenticate the UICC. CK is a cipher key. Lastly, IK is an integrity key.

Upon calculation of the authentication vector, the BSF 20 proceeds to step 50 to send the random number RAND and the authentication token AUTN to the UE 10. The UE 10 then delivers the RAND and the AUTN to the UICC. The UICC verifies the AUTN to confirm whether the message is sent from a valid network. Subsequently, the UICC calculates the integrity key and the cipher key to produce a session key Ks at step 60. Also, the UICC sends an authentication response message RES to the UE 10 which will then deliver the RES to the BSF 10 at step 70. The BSF 20 performs authentication through verification of the response message at step 80, and concatenate the cipher key and the integrity key to generate the session key Ks at step 90.

SUMMARY OF THE INVENTION

GBA supports only mutual authentication between a user identity module and a service provider, without ensuring security through the authentication of a terminal. Despite the need to actually authenticate terminals which use various types of user identity modules, GBA technologies do not support authentication between a user identity module and a terminal. To guarantee the security of the service provider, terminal and user identity module, it is preferable to perform mutual authentication between the user identity module and the terminal as well as mutual authentication between the user identity module and the service provider.

As explained above, conventional GBA technologies support only the mutual authentication between a user identity module and a service provider. The technologies do not ensure security through mutual authentications between the user identity module and the terminal and between the terminal and the service provider. Therefore, a user cannot safely reproduce any purchased content in various terminals using a user identity module, such as a smart card, that carries the user's identity.

Accordingly, the present invention has been made to solve the above-mentioned problems occurring in the prior art, and an object of the present invention is to provide a method for inclusive authentication and management of a service provider, a terminal and a user identity module, and a system and a terminal device using the method.

Another object of the present invention is to provide a method for inclusive authentication and management of a service provider, a terminal and a user identity module through digital rights management to allow safe reproduction of any purchased content in various terminals using the user identity module, and a system and a terminal using the method.

In order to accomplish the above objects of the present invention, there is provided a method for inclusive authentication and management of a service provider, a terminal and a user identity module, which includes the steps of: transferring through the terminal a notification message from the service provider to the user identity module; verifying a response message corresponding to the notification message; generating and sending an authentication result message for the terminal and the user identity module according to results of the verification; and allowing the terminal and the user identity module to perform mutual authentication based on the authentication result message.

In accordance with another aspect of the present invention, there is provided a method for inclusive authentication and management of a service provider, a terminal and a user identity module, which includes the steps of: receiving from the terminal an authentication request message sent to the service provider; generating a notification message corresponding to the authentication request message and transferring through the terminal the notification message from the service provider to the user identity module; verifying a response message corresponding to the notification message; generating and sending an authentication result message for the terminal and the user identity module according to results of the verification; and performing mutual authentication in the terminal and the user identity module based on the authentication result message.

In accordance with still another aspect of the present invention, there is provided a method for inclusive authentication and management of a service provider, a terminal and a user identity module, which includes the following steps performed by the terminal: receiving a notification message from the service provider and transferring the notification message to the user identity module; receiving a response message from the user identity module, adding information necessary for authentication of the terminal to the response message and transferring to the service provider the response message with the authentication information; receiving from the service provider a result message including results of verification performed on the user identity module and the terminal; authenticating the user identity module using the received result message; and transferring the result message to the user identity module so that the terminal can be authenticated by the user identity module.

In accordance with still another aspect of the present invention, there is provided a system for mutual authentication between a service provider, a terminal and a user identity module, which includes: the service provider for sending a notification message, verifying a response message corresponding to the notification and generating an authentication result message for the terminal and the user identity module based on the verification; the terminal for transferring the notification message received from the service provider to the user identity module, sending to the service provider a response message received from the user identity module, receiving an authentication result message from the service provider and authenticating the user identity module using the authentication result message; and the user identity module for generating the response message corresponding to the notification message, transferring the response message to the terminal and authenticating the terminal using the authentication result message received through the terminal.

In accordance with still another aspect of the present invention, there is provided a system for mutual authentication between a service provider, a terminal and a user identity module, which includes: the service provider for sending a notification message in response to an authentication request message received from the terminal, verifying a response message corresponding to the notification and generating an authentication result message for the terminal and the user identity module based on the verification; the terminal for transferring the notification message received from the service provider to the user identity module, sending to the service provider a response message received from the user identity module, receiving an authentication result message from the service provider and authenticating the user identity module using a cipher key shared with the service provider; and the user identity module for generating the response message corresponding to the notification message, transferring the response message to the terminal, receiving the authentication result message transferred from the terminal and authenticating the terminal using a cipher key shared with the service provider.

In accordance with still another aspect of the present invention, there is provided a terminal device for use in mutual authentication between a service provider, a terminal and a user identity module, which includes: a communication module for receiving a notification message from the service provider and sending to the service provider a response message corresponding to the notification message; an interface module for transferring the notification message received through the communication module to the user identity module and receiving from the user identity module the response message corresponding to the notification message; and an authentication module for adding information necessary for authentication of the terminal to the response message which will be sent to the service provider, authenticating the user identity module using a verification result message on the user identity module and the terminal received from the service provider, and transferring the received result message to the user identity module so that the terminal can be authenticated by the user identity module.

BRIEF DESCRIPTION OF THE DRAWINGS

The above and other objects, features and advantages of the present invention will be more apparent from the following detailed description taken in conjunction with the accompanying drawings, in which:

FIG. 5 is a flow chart showing a process of mutual authentication between a service provider, a terminal and a user identity module according to an embodiment of the present invention;

FIGS. 6A, 6B, 6C and 6D are diagrams showing formats of messages sent or received between a service provider, a terminal and a user identity module according to an embodiment of the present invention;

FIGS. 8A, 8B, 8C, 8D, 8E, 8F and 8G are diagrams showing formats of messages sent or received between a service provider, a terminal and a user identity module according to an embodiment of the present invention.

DETAILED DESCRIPTION OF THE PREFERRED EMBODIMENT

Figure 1:
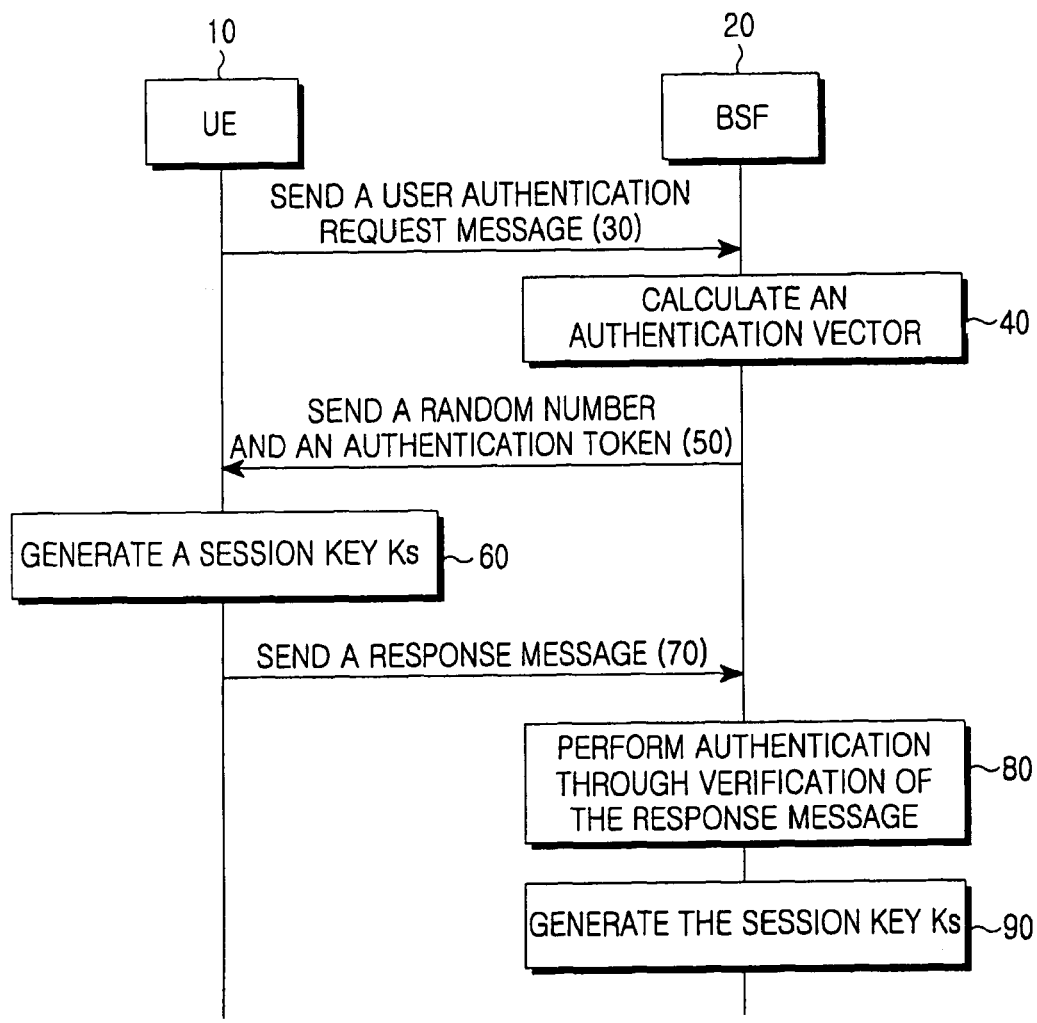
FIG. 1 is a diagram showing a general process of mutual authentication between a BSF and a UE.

Hereinafter, preferred embodiments of the present invention will be described with reference to the accompanying drawings. In the drawings, the same element, although depicted in different drawings, will be designated by the same reference numeral or character. Also, in the following description of the present invention, a detailed description of known functions and configurations incorporated herein will be omitted when it may make the subject matter of the present invention unclear.

The present invention relates to a method and system for mutual inclusive authentication between a service provider, a terminal and a user identity module. The authentication system is configured in a structure that can interact with a public key infrastructure of the current network security environment and can be independently used in a specific network system. The inclusive authentication method is divided into public key authentication and symmetric key authentication. Mutual authentication can be made between a service provider, a terminal and a user identity module using any of the two authentication schemes. Then a user can access content on any terminal device based on the user's identity.

Hereinafter, each component of the inclusive authentication system according to the present invention will be explained in detail with reference to FIG. 2.

Figure 2:
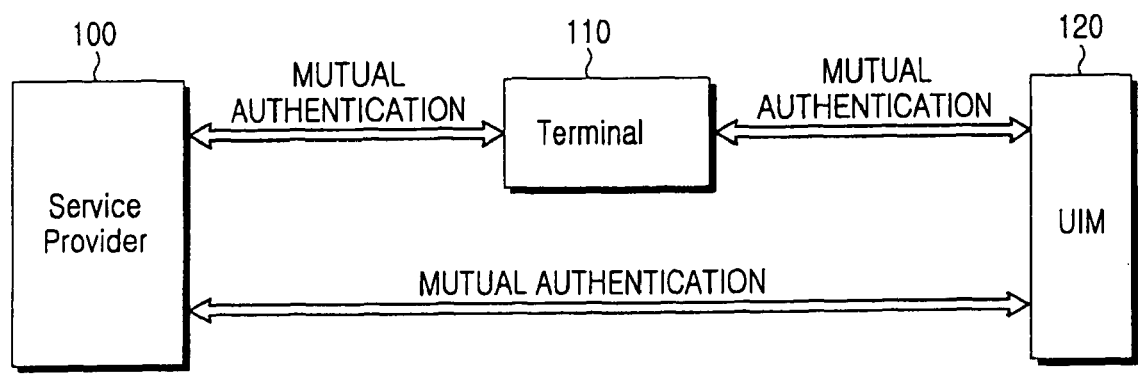
FIG. 2 is a diagram showing the configuration of a system for performing inclusive authentication according to an embodiment of the present invention.

As illustrated in FIG. 2, a service provider ("SP") 100 authenticates and inclusively manages a user terminal ("T") 110 and a user identity module ("UIM") 120. The service provider 100 offers its content and services to every terminal permitted to use the content. The terminal 110 is a device interacting with the user identity module 120. As a module representing the user's identity, the user identity module 120 has a cipher key and an encryption algorithm used during authentication. The user identity module 120 can be any of a smart card, a SIM card, a removable media, and other memory cards having a security function.

Figure 3:
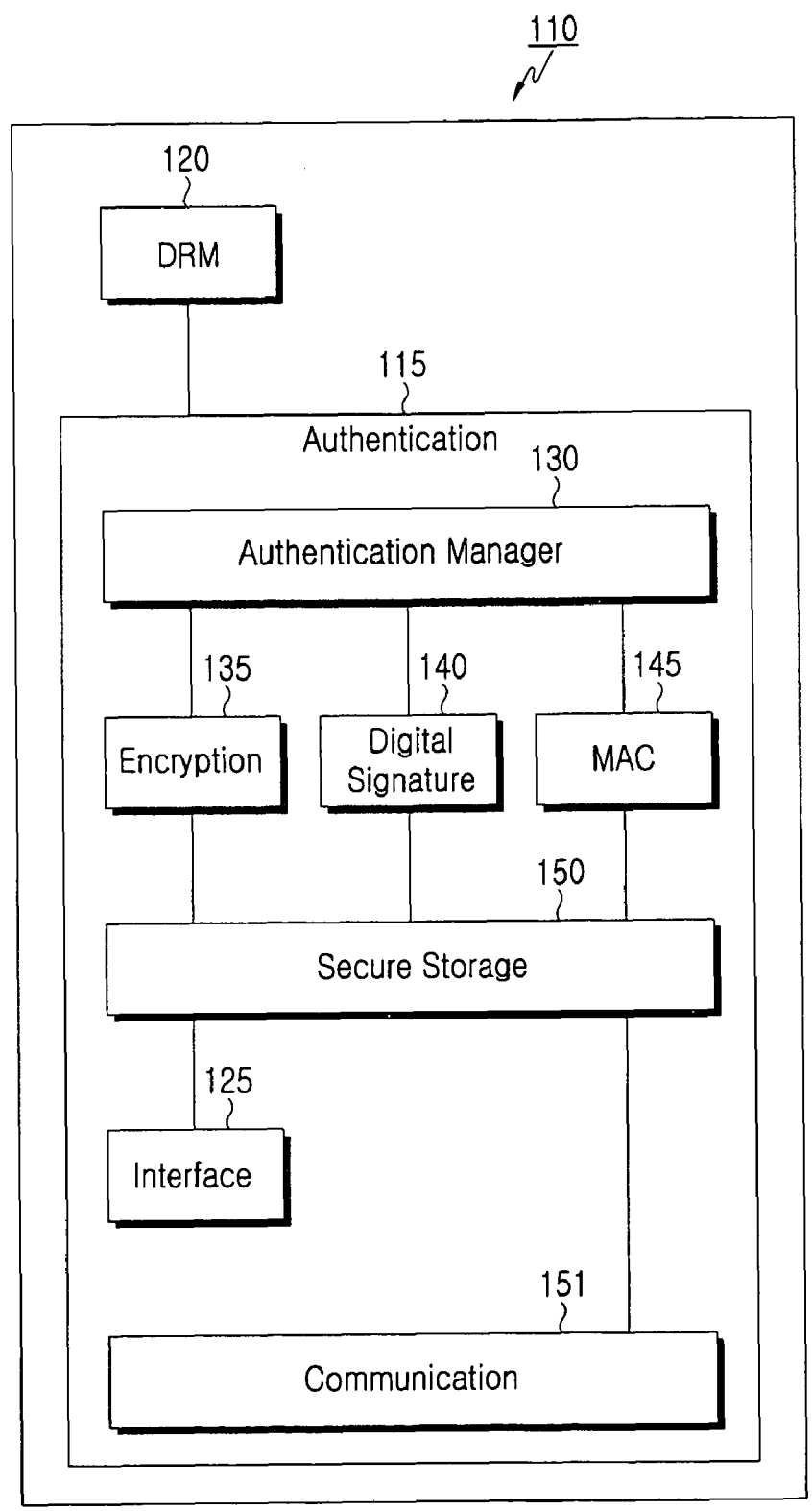
FIG. 3 is a block diagram of a terminal according to an embodiment of the present invention.
Figure 4:
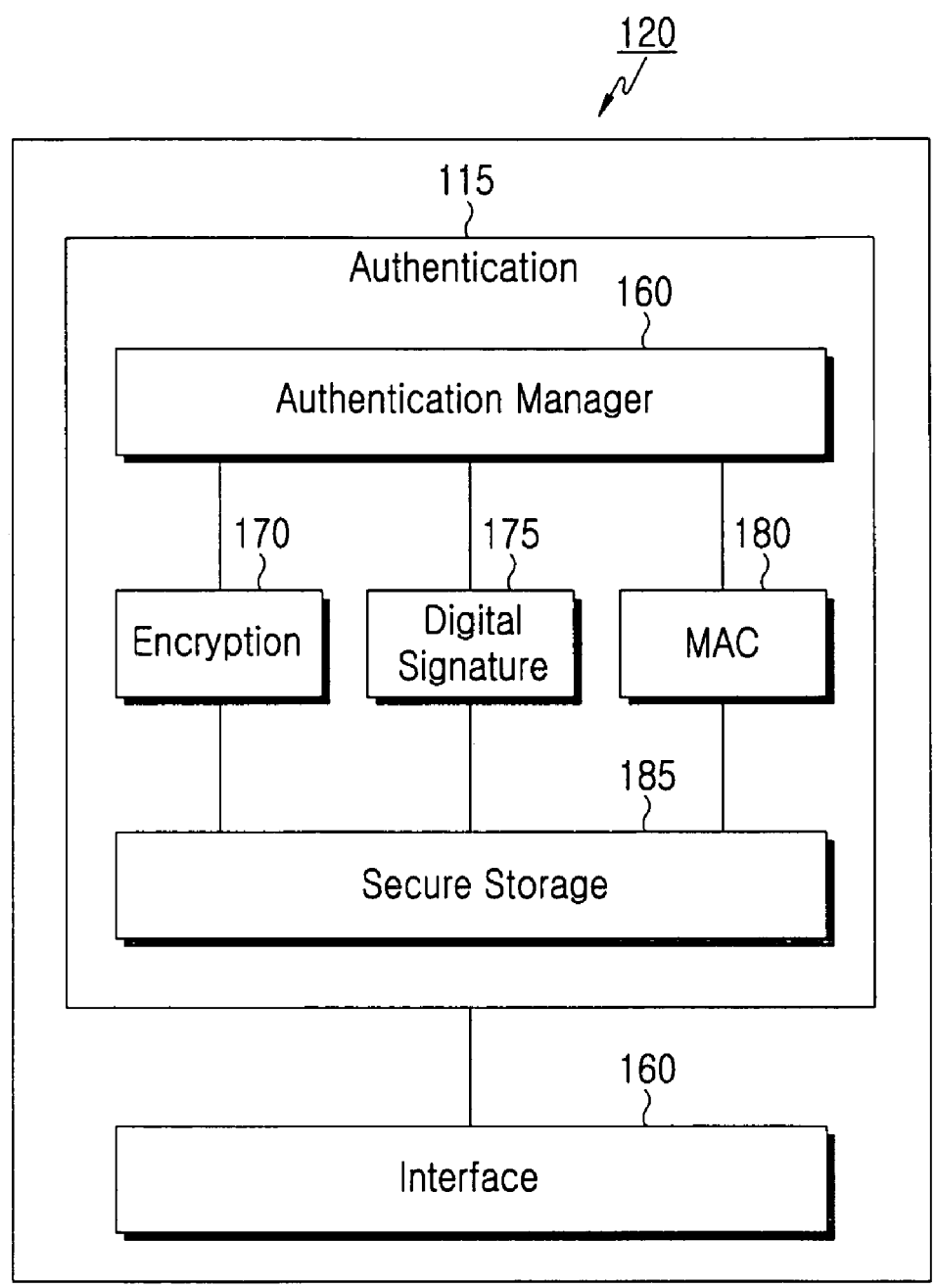
FIG. 4 is a block diagram of a user identity module according to an embodiment of the present invention.

FIGS. 3 and 4 are block diagrams of a terminal and a user identity module according to the present invention. As illustrated in FIG. 3, the terminal 110 includes an authentication module 115, a communication module 151 and an interface module 125 for communication with the user identity module 120. Specifically, the authentication module 115 is composed of an authentication manager 130 for managing an overall authentication function, an encryption module 135 for offering encryption functions, a digital signature module 140 for setting a digital signature, a MAC module 145 for implementing a MAC algorithm and a secure storage module 150 for safely storing a cipher key or the like.

The authentication module 115 having the above structure adds information necessary for authentication of the terminal 110 to a response message received from the user identity module 120 and sends to the service provider 100 the response message with the authentication information. When a result message including results of a verification process performed on the user identity module 120 and the terminal 110 is received from the service provider 100, the authentication module 115 authenticates the user identity module 120 using the resulting message. Also, the authentication module 115 transfers the received result message to the user identity module 120 so that authentication of the terminal 110 can be made in the user identity module 120.

The communication module 120 is in charge of communicating with a network. Particularly, the communication module 120 receives a notification message from the service provider 100 and sends a corresponding response message to the service provider 100. The interface module 125 is in charge of communicating with the user identity module 120. The interface module 125 transfers to the user identity module 120 the notification message received through the communication module 120 and receives from the user identity module 120 the corresponding response message.

As illustrated in FIG. 4, the user identity module 120 includes an authentication module 155 and an interface module 160. The authentication module 155 is composed of an authentication manager 165 for managing the overall authentication function, an encryption module 70 for offering encryption functions, a digital signature module 175 for setting a digital signature, a MAC module 180 and a secure storage module 185 for safely storing a cipher key or the like.

The authentication module 155 generates a response message including a digital signature of the user identity module 120 when a notification message transferred from the terminal 110 is received. Also, the authentication module 155 authenticates the terminal 110 using a result message transferred from the terminal 110. The interface module 160 receives the notification message transferred from the terminal 100 and transfers to the terminal 110 the response message generated in response to the notification message.

The user identity module 120 and the terminal 110 both store a unique pair of public key and secret key. Particularly, the secret key is stored in a TRM (Tamper Resistance Module) to prevent any unauthorized access. As illustrated in FIG. 2, the user identity module 120 interacts with the terminal 110 to perform mutual authentication with the service provider 100. A protocol used in accordance with the present invention is independently constructed in a specific encryption algorithm, digital signature or MAC algorithm. For example, an RSA (asymmetric public key encryption algorithm) or any other algorithm can be used as the public key encryption algorithm.

Hereinafter, a process of public-key based mutual authentication according to the present invention will be explained in detail with reference to FIGS. 5 and 6. FIG. 5 is a flow chart showing a process of mutual authentication between a service provider, a terminal and a user identity module according to the present invention. FIGS. 6A through 6D are diagrams showing formats of messages sent or received between a service provider, a terminal and a user identity module according to the present invention.

It is assumed that each of the service provider, terminal and user identity module has received a pair of a public key and a secret key in the public-key based structure to use the keys for mutual authentication.

Referring to FIG. 5, the service provider 100 sends a notification message to the terminal 110 at step 300. The service provider 100 may periodically send the notification message to start the authentication process or send the notification message when the terminal 110 directly sends a request for authentication to the service provider 100. The user identity module 120 and the terminal 110 can verify the authenticity of a digital signature of the service provider 100 using the previously received public key of the service provider 100 in the public-key cryptosystem. Therefore, even without a direct request for authentication from the terminal 110, the authentication process can be started with unilateral sending of the notification message from the service provider 100.

The notification message sent from the service provider 100 to the terminal 110 has a format as illustrated in FIG. 6A. Referring to FIG. 6A, the notification message format contains fields of ID_SP 400, RND 405, TS1 410 and Sign_SP (ID_SP∥RND∥TS1) 420. ID_SP 400 is a field indicating the service provider's identity information (identifier). RND 405 is a field storing information (a random number) randomly extracted to indicate a newly received message. TS1 410 is a field for setting time information of the first transmission by the service provider. Sign_SP(ID_SP∥RND∥TS1) 420 is a field representing a digital signature on the first message from the service provider.

When receiving the notification message having the above format, the terminal 110 simply transfers the received message to the user identity module 120 at step 305. Then the user identity module 120 generates a response message including its own digital signature at step 310. The digital signature can tell that the response message originated from the user identity module 120. The response message has a format as illustrated in FIG. 6B. The response message format contains fields of ID_SP 400, RND 405, TS1 410, ID_U 440 and Sign_U(ID_SP∥RND∥TS1∥ID_U) 445. ID_U 440 is a field representing identity information of the user identity module

120. Sign_U(ID_SP||RND||TS1||ID_U) 445 is a field for setting a digital signature of the user identity module 120.

When the response message is transferred to the terminal 110 from the user identity module 120 at step 315, the terminal 110 adds its own digital signature to the response message. The response message with the terminal's digital signature is in a format as illustrated in FIG. 6C, which adds two more fields, ID_T 450 and Sign_T (ID_SP1||RND||TS1||ID_T) 455, to the message format of FIG. 6B. ID_T 450 is a field representing identity information of the terminal 110. Sign_T (ID_SP||RND||TS1||ID_T) 455 is a field for setting a digital signature of the terminal 110. At step 325, the terminal 100 sends the response message in the format as illustrated in FIG. 6C, i.e. the response message with the terminal's digital signature, to the service provider 100.

At step 330, the service provider 100 generates an authentication result message through verification of the received response message. To be specific, the service provider 100 verifies two fields in the received response message, i.e. Sign_U(ID_SP||RND||TS1||ID_U) 445 in which the digital signature of the user identity module 120 has been set and Sign_T (ID_SP||RND||TS1||ID_T) 455 in which the digital signature of the terminal 110 has been set, using a public key corresponding to ID_U 440 and ID_T 450. At this time, the service provider 100 authenticates the user identity module 120 and the terminal 110 through verification of each concerning field.

When the digital signature of the user identity module 120 is successfully verified, the service provider 100 then authenticates the user identity module 120 and generates a Proof_U message informing that the authentication is successful. Proof_U, data used to inform of the successful authentication, is composed of ID_U||"Success." When the authentication fails, the service provider 100 generates a Proof_U message composed of ID_U|| "Fail." Similarly, the service provider 100 verifies the terminal's digital signature in the field, Sign_T (ID_SP||RND||TS||ID_T) 455, using the public key of the terminal 110. When the verification is successful, the service provider 100 generates a Proof_T message composed of ID_T|| "Success" to report the success in authentication. Otherwise, the service provider 100 generates a Proof_T message composed of ID_T|| "Failure" to report the failure in authentication.

At step 335, the service provider 100 sends an authentication result message, including the results of verification performed on the terminal 110 and the user identity module 120, to the terminal 110. The authentication result message has a format as illustrated in FIG. 6D. The message format contains fields of E(Pub_U, K) 460, Proof_U 465, Proof_T 470, TS2 475 and Sign_SP(E(Pub_U, K)||Proof_U||Proof_T||TS2) 480. E(Pub_U, K) 460 is a field containing information about a session key K encrypted with the public key. Proof_U 465 and Proof_T 470 are fields representing the results of authentication of the user identity module 120 and the terminal 110, respectively. TS2 475 is a field for setting time information (time stamp) of the second transmission by the service provider 100. Sign_SP(E(Pub_U, K)||Proof_U||Proof_T||TS2) 480 is a field for setting a digital signature of the service provider 100. The encrypted information field can be represented by, for example, E(P, D) which means an algorithm for encrypting data D with a cipher key K. E stands for encryption.

When receiving the authentication result message from the service provider 100, the terminal 110 transfers the message to the user identity module 120 so that it can be authenticated by the user identity module 120. In other words, the terminal 110 and the user identity module 120 performs mutual authentication and related operations with verification of the authentication result message at step 345.

To be specific, the terminal 110 verifies the TS2 475 field in the authentication result message. If the time value in TS2 is outside a predetermined range of values, the terminal 110 will inform the user identity module 120 and the user that the message is not authentic. If the time value is within the predetermined range, the terminal 110 will then verify the digital signature on the message. If the verification fails, the terminal 110 will inform the user identity module 120 and the user of the failure and stop all related operations.

If the verification of the digital signature is successful, the terminal 110 will check Proof_U 465 in the authentication result message to confirm whether the user identity module 120 is authentic. If the authentication result in Proof_U 465 is "Fail," the terminal 110 will send an error message to the user identity module 120 and the user and will stop all related operations. Otherwise, if the authentication result is "Success," the terminal 110 will recognize that the authentication of the user identity module 120 is successful and will terminate the authentication process.

The user identity module 120 also verifies the TS2 475 field in the authentication result message. If the time value in TS2 is outside a predetermined range of values, the user identity module 120 will inform the terminal 110 that the message is not authentic and will stop all related operations. If the time value is within the predetermined range, the user identity module 120 will then verify the digital signature on the message. If the verification fails, the user identity module 120 will inform the terminal 110 of the failure and stop all related operations. If the verification of the digital signature is successful, the user identity module 120 will check Proof_T 470 in the authentication result message to confirm whether the terminal 110 is authentic. If the authentication result in Proof_T 470 is "Fail," the user identity module 120 will send an error message to the terminal 110 and will stop all related operations. Otherwise, if the authentication result is "Success," the user identity module 120 will recognize that the authentication of the terminal 110 is successful and will terminate the authentication process.

When the mutual authentication between the terminal 110 and the user identity module 120 is successful, the user identity module 120 and the service provider 100 can share the session key K. In other words, the user identity module 120 obtains the session key K from the authentication result message and thereby can share the session key with the service provider 100.

Figure 7:
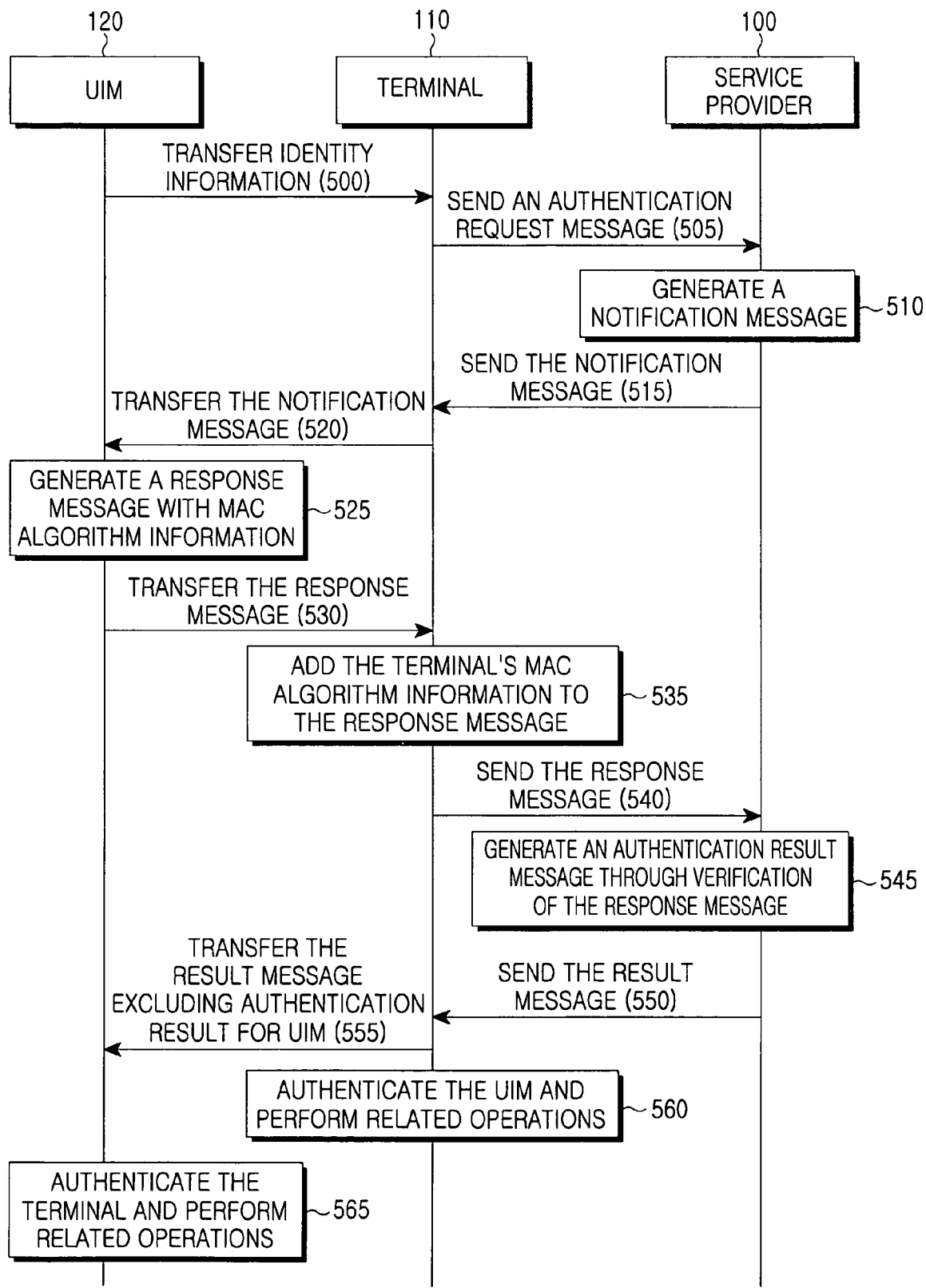
FIG. 7 is a flow chart showing a process of mutual authentication between a service provider, a terminal and a user identity module according to an embodiment of the present invention.

Public-key based mutual authentication has been explained above. Hereinafter, symmetric-key based mutual authentication according to another embodiment of the present invention will be explained in detail with reference to FIGS. 7 and 8. FIG. 7 is a flow chart showing a process of mutual authentication between a service provider, a terminal and a user identity module according to the present invention. FIGS. 8A through 8G are diagrams showing formats of messages sent or received between a service provider, a terminal and a user identity module according to the present invention.

This embodiment of the present invention provides a symmetric-key based mutual authentication using a pair of cipher (symmetric) keys, one shared between the service provider and the terminal and the other shared between the service provider and the user identity module. The service provider protects a message with a cipher key shared with the user identity module or the terminal when sending the message. Therefore, unlike the first embodiment of the present invention, the service provider 100 cannot first send a notification message to any terminal. In accordance with this embodiment, the terminal 110 first sends a request of authentication to the service provider 100.

Referring to FIG. 7, the user identity module 120 transfers its identity information ID_U 600 as illustrated in FIG. 8A to the terminal 110 at step 500. Then the terminal 110 proceeds to step 505 to add its identity information ID_T 605 to the identity information ID_U 600 received from the user identity module 120 and send an authentication request message, as shown in FIG. 8B, with the ID_U 600 and ID_T 605 to the service provider 100.

In response to the authentication request message, the service provider 100 generates a notification message at step 510 and sends the message to the terminal 110 at step 515. The terminal 110 then transfers the notification message to the user identity module 120 at step 520. The notification message has a format as illustrated in FIG. 8C. The format contains fields of: ID_SP 610 indicating identity information of the service provider 100; RND 615 indicating a random number; TS1 620 representing time information of the first transmission by the service provider 100; MAC1 625 including a MAC (Message Authentication Code) algorithm implemented on the data in parenthesis using the cipher (symmetric) key shared between the user identity module 120 and the service provider 100; and MAC2 630 including a MAC algorithm implemented on the data in parenthesis using the cipher (symmetric) key shared between the terminal 110 and the service provider 100.

When the notification message having the above format is transferred to the user identity module 120 through the terminal 110, the user identity module 120 generates a response message having a format as illustrated in FIG. 8D at step 525. The response message format contains fields of ID_U 635 indicating identity information of the user identity module 120 and MAC1 640 for setting a value obtained through a MAC algorithm implemented using the cipher key shared between the user identity module 120 and the service provider 100. The user identity module 120 transfers the generated response message to the terminal 110 at step 530. Then the terminal 110 adds its MAC algorithm to the received response message at step 535. In other words, two more fields, ID_T 650 indicating identity information of the terminal 110 and MAC2 655 for setting a result value of the MAC algorithm implemented using the cipher shared between the terminal 110 and the service provider 100, are added to the response message received from the user identity module 120 as illustrated in FIG. 8E.

The terminal 110 sends the response message as illustrated in FIG. 8E to the service provider 100 at step 540. Then the service provider 100 verifies the response message to generate an authentication result message having a format as illustrated in FIG. 8F at step 545 and sends the authentication result message to the terminal 110 at step 550. Since the subsequent process of extracting the authentication results for each of the terminal 110 and the user identity module 120 is identical to that explained in the first embodiment of the present invention, no further explanation will be made. The authentication result message includes authentication results Proof_U 665 and Proof_T 670 which show whether authentication of the terminal 110 and the user identity module 120 has been successful.

Referring to FIG. 8F, the authentication result message sent to the terminal 110 contains fields of: E(Sym1, K) 660 for setting a result value of encryption of the session key K with the cipher key Sym1 shared between the user identity module 120 and the service provider 100; Proof_U 665; Proof_T 670; TS2 675 for setting time information (time stamp) of the second transmission by the service provider 100; MAC1 680 for setting a result value of the MAC algorithm implemented on the user identity module 120; and MAC2 685 for setting a result value of the MAC algorithm implemented on the terminal 110.

When receiving the authentication result message from the service provider 100, the terminal 110 transfers the message excluding fields required for authentication of the user identity module 120 (in a format of FIG. 8G) to the user identity module 120 at step 555. Subsequently, the terminal 110 performs authentication of the user identity module 120 and related operations at step 560. The user identity module 120 also performs authentication of the terminal 110 and related operations. While authentication according to the first embodiment of the invention includes verification of digital signatures, authentication according to the second embodiment includes MAC verification. To be specific, the terminal 110 authenticates the user identity module 120 through the process of verifying MAC2 685 that sets a result value of MAC algorithm with the cipher key shared between the terminal 110 and the service provider 100. With the authentication, it is possible to share the session key K between the user identity module 120 and the service provider 100 and determine whether each module is authentic.

As explained above, mutual authentications between the user identity module and the terminal, between the service provider and the terminal and between the service provider and the user identity module can be inclusively made according to the present invention, thereby ensuring security in both the user identity module and the terminal. Therefore, a user can access content on any terminal device using the content license based on the user's identity. The inclusive authentication according to the present invention is also applicable to conventional public-key or symmetric-key infrastructures, eliminating need for a separate security infrastructure. Moreover, since the inclusive authentication according to the present invention does not rely on a specific network authentication technology, such as 3GPP GBA, it can be independently applied to various sub-network structures.

Although preferred embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A method for authentication and management of a service provider, a terminal and a user identity module, comprising:

transferring through the terminal a notification message from the service provider to the user identity module;

verifying a response message corresponding to the notification message;

generating and sending to the terminal and the user identity module an authentication result message according to results of the verification; and performing mutual authentication in the terminal and the user identity module based on the authentication result message, wherein verifying the response message comprises:

when the user identity module receives the notification message transferred through the terminal, generating a response message by adding to the notification message a digital signature of the user identity module; and when the terminal receives the response message from the user identity module, adding a digital signature of the terminal to the received response message and sending to the service provider the response message with the terminal's digital signature.

2. The method as claimed in claim 1, wherein said notification message has a format including an identity information field offering the service provider's identity information, a random number field storing randomly extracted information, a time stamp field offering time information of the transmission of the notification message by the service provider, and a digital signature field for setting a digital signature of the service provider.

3. The method as claimed in claim 1, wherein said response message sent from the user identity module has a format including an identity information field offering identity information of the service provider, a random number field storing randomly extracted information, a time stamp field offering time information, an identity information field offering identity information of the user identity module, and a digital signature field for setting a digital signature of the user identity module.

4. The method as claimed in claim 1, wherein said response message sent from the terminal has a format which includes an identity information field offering identity information of the terminal and a digital signature field for setting a digital signature of the terminal added to the response message sent from the user identity module.

5. The method as claimed in claim 1, wherein said step of verifying a response message is a verification process performed by the service provider on the digital signature field for setting the digital signature of the terminal in the response message using a public key.

6. The method as claimed in claim 1, wherein said step of verifying a response message is a verification of the digital signature field for setting the digital signature of the user identity module in the response message using a public key.

7. The method as claimed in claim 1, wherein said step of generating and sending an authentication result message includes:
   outputting an authentication result informing of a success or a failure of the authentication of the terminal;
   outputting an authentication result informing of a success or a failure of the authentication of the user identity module; and
   generating an authentication result message including the authentication results for the terminal and the user identity module and information about a session key encrypted with a public key, and sending the generated authentication result message.

8. The method as claimed in claim 1, wherein said step of performing mutual authentication includes the following substeps performed by the terminal:
   verifying the received authentication result message by checking a digital signature field and a time stamp field within the message; and
   when the verification is successful, confirming if the authentication of the user identity module is successful.

9. The method as claimed in claim 8, wherein said step of performing mutual authentication further includes:
   when either the verification or the authentication fails, informing the user identity module of the failure and stopping related operations.

10. The method as claimed in claim 1, wherein said step of performing mutual authentication includes the following substeps performed by the user identity module:
   verifying the received authentication result message by checking a digital signature field and a time stamp field within the message;
   when the verification is successful, confirming if the authentication of the terminal is successful; and
   when the authentication is successful, obtaining from the authentication result message a session key shared with the service provider.

11. A method for authentication and management of a service provider, a terminal and a user identity module, which comprises the steps of:
   receiving an authentication request message sent to the service provider from the terminal;
   generating a notification message corresponding to the authentication request message and transferring through the terminal the notification message from the service provider to the user identity module;
   verifying a response message corresponding to the notification message;
   generating and sending to the terminal and the user identity module an authentication result message according to results of verification; and
   performing authentication in the terminal and the user identity module based on the authentication result message;
   wherein verifying the response message comprises:
   when the user identity module receiving the notification message transferred through the terminal, generating a response message including information about a message authentication code (MAC) algorithm implemented using a first cipher key shared with the service provider; and
   when the terminal receives the response message from the user identity module, adding to the received response message information about a MAC algorithm implemented using a second cipher key shared with the service provider, and sending to the service provider the response message with the second cipher key based MAC algorithm information.

12. The method as claimed in claim 11, wherein said authentication request message received from the terminal includes identity information of the terminal and the user identity module.

13. The method as claimed in claim 11, wherein said notification message has a format including an identity information field offering the service provider's identity information, a random number field, a time stamp field, a MAC1 field for setting information about a MAC algorithm implemented using a first cipher shared between the service provider and the user identity module, and a MAC2 field for setting information about a MAC algorithm implemented using a second cipher key shared between the service provider and the terminal.

14. The method as claimed in claim 11, wherein said response message generated by the user identity module further includes an identity information of the user identity module.

15. The method as claimed in claim 11, wherein said terminal further adds identity information thereof to the response message with the second cipher key based MAC algorithm information.

16. The method as claimed in claim 11, wherein said step of verifying a response message is a verification process performed by the service provider on the MAC algorithm information in the response message using the first cipher key shared with the user identity module.

17. The method as claimed in claim 11, wherein said step of verifying a response message is a verification process performed by the service provider on the MAC algorithm information in the response message using the second cipher key shared with the terminal.

18. The method as claimed in claim 11, wherein said step of generating and sending an authentication result message includes:
   outputting an authentication result informing of a success or a failure of the authentication of the terminal and the user identity module; and
   generating an authentication result message including the authentication results for the terminal and the user identity module and sending the generated authentication result message.

19. The method as claimed in claim 18, wherein said authentication result message has a format that includes a field for setting information about a session key encrypted with the cipher key shared between the user identity module and the service provider, a field representing the authentication result for the user identity module, a field representing the authentication result for the terminal; a time stamp field for setting time information, a MAC field for setting information of the MAC algorithm implemented using the first cipher key shared between the user identity module and the service provider, and a MAC field for setting information of the MAC algorithm implemented using the second cipher key shared between the terminal and the service provider.

20. The method as claimed in claim 11, wherein said step of performing authentication includes the following sub-steps performed by the terminal:
   verifying the received authentication result message by checking time information and MAC algorithm information in the message; and
   when the verification is successful, confirming if the authentication of the user identity module is successful.

21. The method as claimed in claim 11, wherein said step of performing authentication includes the following sub-steps performed by the user identity module:
   verifying the received authentication result message by checking time information and MAC algorithm information in the message;
   when the verification is successful, confirming if the authentication of the terminal is successful; and
   when the authentication is successful, obtaining a session key shared with the service provider from the authentication result message.

22. A system for mutual authentication between a service provider, a terminal and a user identity module, comprising:
   the service provider for sending a notification message, verifying a response message corresponding to the notification message, and generating an authentication result message for the terminal and the user identity module based on the verification;
   the terminal for transferring the notification message received from the service provider to the user identity module, sending a response message received from the user identity module to the service provider, receiving an authentication result message from the service provider, and authenticating the user identity module using the authentication result message; and
   the user identity module for generating the response message corresponding to the notification message, transferring the response message to the terminal, and authenticating the terminal using the authentication result message received through the terminal,
   wherein verifying the response message comprises:
   when the user identity module receives the notification message transferred through the terminal, the user identity module generates a response message by adding to the notification message a digital signature of the user identity module; and
   when the terminal receives the response message from the user identity module, the terminal adds a digital signature of the terminal to the received response message and sends to the service provider the response message with the terminal's digital signature.

23. The system as claimed in claim 22, wherein said service provider verifies the response message using a public key and sends the authentication result message including the authentication results for the terminal and the user identity module.

24. A system for mutual authentication between a service provider, a terminal and a user identity module, which comprising:
   the service provider for sending a notification message in response to an authentication request message received from the terminal, verifying a response message corresponding to the notification message, and generating an authentication result message for the terminal and the user identity module based on the verification;
   the terminal for transferring the notification message received form the service provider to the user identity module, sending a response message received from the user identity module to the service provider, receiving an authentication result message from the service provider, and authenticating the user identity module using a cipher key shared with the service provider; and
   the user identity module for generating the response message corresponding to the notification message, transferring the response message to the terminal, receiving the authentication result message transferred from the terminal, and authenticating the terminal using a cipher key shared with the service provider,
   wherein the user identity module generates a response message including information about a message authentication code (MAC) algorithm implemented using a first cipher key shared with the service provider when the user identity module receives the notification message transferred through the terminal, and
   wherein the terminal adds to the received response message information about a MAC algorithm implemented using a second cipher key shared with the service provider, and sends to the service provider the response message with the second cipher key based MAC algorithm information when the terminal receives the response message from the user identity module.

25. The system as claimed in claim 24, wherein said user identity module generates the response message by implementing a MAC algorithm using a cipher key shared between a user identity module and the service provider and transfers the generated response message to the terminal.

26. The system as claimed in claim 24, wherein said terminal adds information of a MAC algorithm implemented using a cipher key shared between a terminal and the service provider to the response message received from the user identity module and sends the response message with the MAC algorithm information to the service provider.

27. A method for inclusive authentication and management of a service provider, a terminal and a user identity module, which comprises the steps performed by the terminal of:
   receiving a notification message from the service provider and transferring the notification message to the user identity module;
   receiving a response message corresponding to the notification message from the user identity module, adding information necessary for authentication of the terminal to the response message, and transferring the response message with the authentication information to the service provider;

receiving a verification result message of the user identity module and the terminal;

authenticating the user identity module using the received result message; and transferring the result message to the user identity module so that the terminal can be authenticated by the user identity module, wherein the information necessary for authentication of the terminal comprises a digital signature of the terminal.

28. The method as claimed in claim 27, wherein said response message from the user identity module includes a digital signature of the user identity module.

29. A terminal device for use in mutual authentication between a service provider, a terminal and a user identity module, which comprising:

a communication module for receiving a notification message from the service provider and sending to the service provider a response message corresponding to the notification message;

an interface module for transferring to the user identity module the notification message received through the communication module, and receiving from the user identity module the response message corresponding to the notification message; and an authentication module for adding to the response message information necessary for authentication of the terminal which will be sent to the service provider, authenticating the user identity module using a result message received from the service provider which includes results of verification performed on the user identity module and the terminal by the service provider, and transferring the received result message to the user identity module so that the terminal can be authenticated by the user identity module, wherein the information necessary for authentication of the terminal comprises a digital signature of the terminal.

30. The terminal device as claimed in claim 29, wherein said authentication module comprises:

an authentication manager for managing an overall authentication function;

an encryption module for offering encryption functions;

a digital signature module for setting a digital signature;

a message authentication code (MAC) module for implementing a MAC algorithm; and a secure storage module for safely storing a cipher key.

31. The terminal device as claimed in claim 29, wherein said user identity module comprises:

an authentication module for generating a response message including a digital signature of the user identity module when receiving the notification message transferred from the terminal, and authenticating the terminal using the result message transferred from the terminal; and an interface module for receiving the notification message through the terminal and transferring the response message generated in response to the notification message to the terminal.

32. The terminal device as claimed in claim 29, wherein said authentication module comprises:

an authentication manager for managing an overall authentication function;

an encryption module for offering encryption functions;

a digital signature module for setting a digital signature;

a message authentication code (MAC) module for implementing a MAC algorithm; and a secure storage module for safely storing a cipher key.

\* \* \* \* \*